3,325,318
FUEL SYSTEM COMPRISING SULFUR HEXAFLU-
ORIDE AND LITHIUM CONTAINING FUEL
Richard S. Pauliukonis, Cleveland, Ohio, assignor to
TRW Inc., a corporation of Ohio
No Drawing. Filed Feb. 19, 1962, Ser. No. 174,288
7 Claims. (Cl. 149—109)

This invention relates to oxidant and fuel systems, and more particularly to an oxidant and fuel system for a heat generator utilizing sulfur hexafluoride as the oxidant, which reacts with lithium or other alkali metals and/or metallic mixtures possessing high heat energy capacity that can be stored or immediately extracted for further use.

In particular, the invention is adapted to meet the requirements of heat generators that can provide high heat energy at a controlled rate to the working fluid flowing through a compact container in separate channels or tubes that are embedded into the reacting mass which is completely separated and closed, enabling an easy heat removal for further use. There are many applications which require heat chemically formed, but most of the chemicals either release undesirable gaseous products, instigate undesirable spontaneous side reactions which are uncontrollable at will, or plainly lack the heat energy required. Missiles, satellites and torpedoes are a few examples of applications requiring high heat capacity propellants which form no gases and can be reacted at a controlled rate while being separated from working fluids. Also in direct conversion of heat to electricity in thermoelectric devices, this invention offers excellent capabilities as a heat source.

Heretofore, it has generally been necessary to utilize separate pressurizing means for effecting a movement of the oxidant into the reaction chamber in a heat generator for devices such as torpedoes, missiles and the like. Such means, for example, have entailed pumping, and, recently, use of a medium taken aboard from the ambient air or water. The present invention now provides pressurizing means carried by a vehicle driven by a heat engine-turbine, a thermoelectric device or reaction motor to provide a self-contained power plant. According to this invention, sulfur hexafluoride is provided as an oxidant component of propellant fuel that in combination with the dissimilar conductors or separate working fluids, such as water, mercury, hydrogen or the like, increases the usefulness of self-contained power plants.

Sulfur hexafluoride ($SF_6$) is a stable, odorless, non-toxic readily condensable gas. This material can be stored as a liquid, but can be metered into the reaction chamber under its own vapor pressure, thus dispensing with conventional fuel pumps and other means for displacing or pressurizing the oxidant. The use of propellants having sulfur hexafluoride as an oxidant component makes it possible to utilize equipment which will maintain a constant center of gravity, in a design that is purposely balanced.

It is further an important aspect of the invention to utilize $SF_6$ in combination with lithium or a lithium type fuel in a propellant system suitable for torpedoes, missiles and the like. This oxidant has a calculated performance with lithium that, for example, is equivalent to hydrogen peroxide on a weight basis and is superior on a volume basis.

Sulfur hexafluoride is particularly advantageous where devices require propellants capable of high heat release for a given weight, and capable of long term storage at ordinary temperatures. These factors are critical in torpedo and missile applications, for example. Thus sulfur hexafluoride affords a high heat release potential for a lithium type fuel, together with safe handling and use characteristics and good storage behavior under pressure as a liquefied gas. Also, sulfur hexafluoride can be breathed without harm or discomfort. The safety factor thus afforded is particularly important because torpedoes or missiles must be stored in close proximity to crews, as for example on submarines, and it is essential that the crews be protected from hazards resulting from leakage of propellant.

Accordingly, it is an object of the present invention to provide an oxidant which is self-pressurizing for supplying a power reaction.

Another object of the invention is to provide an oxidant for the use with lithium-type fuels which is safe, readily stored and which affords a high heat ratio per unit weight, and/or volume.

Another object of the invention is to provide an oxidant and fuel system having a lithium-type fuel and sulfur hexafluoride oxidant that can be reacted in a controlled manner simply by flow regulation of the oxidant.

Other objects and advantages of the invention will become apparent from the description hereinafter set forth.

The use of the oxidant of the invention with a lithium-type fuel is exemplified by the following reaction:

$$8Li + SF_6 \rightarrow Li_2S + 6LiF$$ 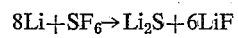

The reaction releases no gaseous products once started, and the $SF_6$ supplied as vapor becomes completely converted to a solid product.

Another advantage of the invention is that it offers a heat source of any desired magnitude which can be controlled simply by inflow of $SF_6$ into the fuel.

This heat source can serve to drive a device such as a torpedo by flowing a working fluid such as water, mercury, $H_2$ or the like through the stationary bed of reactants and/or products for extraction of heat from the source. The working fluid is thus vaporized and converted to mechanical power by expanding it through a turbine, an engine or reaction motor. Conductors or semiconductors of dissimilar materials could be placed in the stationary bed to utilize heat as EMF (electromotive force) in direct generation of electricity for such drives.

The heat release in B.t.u.'s per pound of fuel plus oxidant is, in this instance, 6,530. The handling characteristics of the oxidant are safe, as indicated, and the vapor pressure of the oxidant at 25° C. is 342 p.s.i.a. The specific gravity of liquid sulfur hexafluoride is 1.332 (at 25° C.).

For starting reaction between the fuel and oxidizer in an accelerated manner, a trickle of water, oxygen or acid, or similar accelerators that readily combine with lithium prior to the supply of sulfur hexafluoride at the specified rate necessary for heat generation at a specific desired amount, may be used.

Examples of lithium-type fuels with which the oxidant of the invention may be used are lithium; alloys of lithium and aluminum containing up to 50% of aluminum; alloys of lithium and sodium containing up to 25% of sodium; alloys of lithium with other light metals such as beryllium, magnesium, potassium and calcium; and lithium alloys containing two or more of the above light metals.

Lithium aluminum alloys are particularly important because of their improved performance potential, e.g., when taken on a volume basis. And where lithium is to be at 50% of the alloy, the other constituents may be aluminum, magnesium, beryllium, calcium, sodium and potassium.

There has thus been provided a fuel and oxidant system having marked advantages in heat release per unit weight and volume, which can be controlled at will, and which also has improved storage and handling characteristics, with respect to the oxidant. Further, the fact that the sulfur hexafluoride can be breathed without harm or discomfort affords a marked advantage where a crew must work in proximity to the oxidant storage location.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A method of generating heat in a chemical reactor at a controlled rate comprising the step of reacting sulfur hexafluoride with a lithium type fuel selected from the group consisting essentially of lithium and lithium alloys and producing a solid lithium sulphide and lithium fluoride reaction product.

2. A method of accelerating reaction between sulfur hexafluoride and a fuel selected from the group consisting of lithium and lithium alloys comprising the steps of introducing a trickle of fluid fuel accelerator to the fuel prior to introduction of the sulfur hexafluoride to the fuel, and thereupon introducing sulfur hexafluoride to the fuel.

3. A method of generating heat for a heat generator comprising the step of reacting an oxidant consisting essentially of sulfur hexafluoride with a fuel selected from the group consisting essentially of lithium and lithium alloys, and said lithium alloys including at least one member selected from the group consisting of aluminum, up to 25% sodium, beryllium, magnesium, potassium and calcium, and producing a solid lithium sulphide and lithium fluoride reaction product.

4. A method of generating heat for a heat generator comprising the step of reacting an oxidant consisting essentially of sulfur hexafluoride with lithium as a fuel, and producing or solid lithium sulphide and lithium fluoride reaction product.

5. A method of generating heat comprising the step of reacting an oxidant consisting essentially of sulfur hexafluoride with a lithium alloy fuel consisting essentially of at least 50% lithium and at least one metal selected from the group consisting of aluminum, up to 25% sodium, beryllium, magnesium, potassium and calcium, and producing a solid lithium sulphide and lithium fluoride reaction product.

6. A method of generating heat comprising the step of reacting an oxidant consisting essentially of sulfur hexafluoride with lithium alloy fuel consisting essentially of lithium and up to 50% aluminum, and producing a solid lithium sulphide and lithium fluoride reaction product.

7. In a fuel system for reacting a fuel and an oxidant to generate heat in a heat generator and produce a solid lithium sulphide and lithium fluoride reaction product comprising an alloy fuel consisting essentially of at least 50% lithium and two metals selected from the group consisting of aluminum, up to 25% sodium, beryllium, magnesium, potassium and calcium, and sulfur hexafluoride as the oxidant.

References Cited

Cowen et al.: J. Chem. Soc. (London), pp. 4168–9 (1953), QD 1 C6.

Glossary of Ordnance Terms, Preliminary Edition, June 1959, Ordnance Engr. Handbook Office, Duke University, Durham, N.C., p. 225.

Handbook of Chemistry and Physics, Chemical Rubber Publishing Co., Cleveland, Ohio, 31st edition (1949), p. 526.

Lange's Handbook of Chemistry, 6th ed., 1946, page 254 (TP151 H25).

CARL D. QUARFORTH, *Primary Examiner.*

J. D. VOIGHT, L. A. SEBASTIAN, *Assistant Examiners.*